United States Patent
Ohhashi et al.

(10) Patent No.: US 6,892,117 B2
(45) Date of Patent: May 10, 2005

(54) METHOD OF MEASURING POINT-BLANK PASSING TIME OR THE LIKE OF AIRPLANE

(75) Inventors: Shinji Ohhashi, Ichihara (JP); Kouichi Yamashita, Edgawa-ku (JP); Naoki Hayashi, Yachimata (JP)

(73) Assignee: Nittobo Acoustic Engineering Co., Ltd., Tokyo (JP)

( * ) Notice: Subject to any disclaimer, the term of this patent is extended or adjusted under 35 U.S.C. 154(b) by 113 days.

(21) Appl. No.: 10/451,823
(22) PCT Filed: Dec. 25, 2001
(86) PCT No.: PCT/JP01/11316
§ 371 (c)(1), (2), (4) Date: Jun. 25, 2003
(87) PCT Pub. No.: WO02/052526
PCT Pub. Date: Jul. 4, 2002

(65) Prior Publication Data
US 2004/0117144 A1 Jun. 17, 2004

(30) Foreign Application Priority Data
Dec. 25, 2000 (JP) .................................. 2000-393894

(51) Int. Cl.[7] .............................. G08G 5/00; G01S 13/93
(52) U.S. Cl. .............................. 701/4; 701/10; 701/223; 342/52; 342/65; 343/703
(58) Field of Search .................. 701/3, 4, 10, 300, 701/301, 223; 343/702, 703, 705, 761; 342/25, 52, 65, 188, 192; 702/144

(56) References Cited

U.S. PATENT DOCUMENTS

| | | | |
|---|---|---|---|
| 4,179,697 A | | 12/1979 | Golinsky ..................... 342/458 |
| 5,579,012 A | * | 11/1996 | Iwakuni et al. .............. 342/117 |
| 5,608,411 A | * | 3/1997 | Rose ........................... 342/417 |
| 6,107,962 A | * | 8/2000 | Calvert ........................ 342/362 |

FOREIGN PATENT DOCUMENTS

| | | |
|---|---|---|
| JP | 3-55069 | 12/1991 |
| JP | 4-40646 | 7/1992 |
| JP | 6-249704 | 9/1994 |
| JP | 7-63559 | 3/1995 |

\* cited by examiner

Primary Examiner—Tan Q. Nguyen
(74) Attorney, Agent, or Firm—Jordan and Hamburg LLP

(57) ABSTRACT

A terrain clearance measuring radio wave being emitted from an airplane is received, and changes in electric field intensity of the radio wave is input and recorded to a computer, whereby the time of occurrence of a sharply appearing peak value of the changes permits accurate measurement of the point-blank passing time, independent of flight frequency.

9 Claims, 10 Drawing Sheets

13:20 35sec

13:31 03sec

13:35 22sec

13:41 40sec

13:44 10sec

13:51 05sec

13:56 32sec

Fig. 11
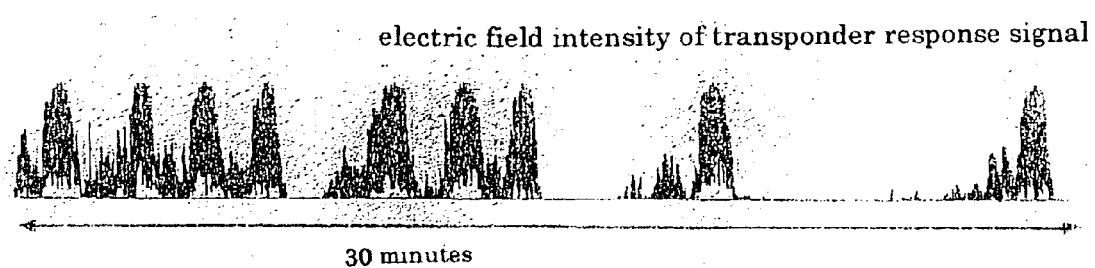
30 minutes
Fig. 12
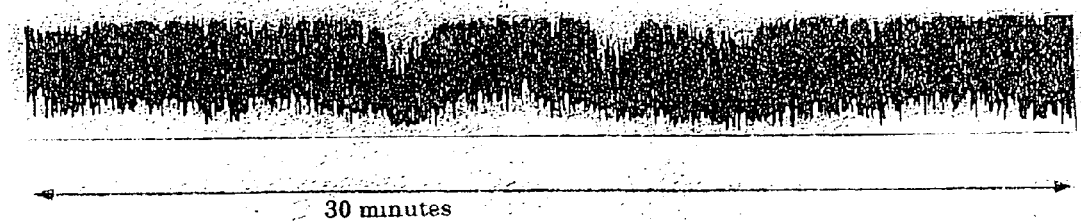
30 minutes

METHOD OF MEASURING POINT-BLANK PASSING TIME OR THE LIKE OF AIRPLANE

TECHNICAL FIELD

The invention relates to a method for measuring, at one spot on the ground, the point-blank passing time at which an airplane flying through the overhead sky comes closest to the spot, and a method for measuring the flight position, flight direction, and flight course of the airplane, and the sound noise produced by the airplane, using the above described method.

BACKGROUND ART

Accurate collecting of point-blank passing time of an airplane passing through the overhead sky at one spot on the ground is an essential basic requirement for increasing measurement accuracy when various measurements are performed on the airplane.

In conventional measurement of point-blank passing time, point-blank passing time is usually estimated by removing noise components from data on changes in sound noise level, obtained by measuring airplane-produced sound noise, with reference to the time when the peak value of the change of sound noise level is collected, and further by taking into account the weather and meteorological conditions and the like.

Further, in measuring the above described airplane sound noise, by receiving a transponder response signal radio wave of 1090 MHz which is emitted from the airplane and non-directional in horizontal plane, and by examining the correlations between the changes in the electric field intensity level of the radio wave and the airplane model identification data and flight height data obtained by decoding the transponder response signal, it has been possible to accurately measure the point-blank passing time based on the time when the peak value of electric field intensity is collected (Japanese Patent Laid-Open No. 4-40646).

In a conventional method for measuring point-blank passing time according to the above described airplane-produced sound noise measurement, the method requires taking into account complicated variable factors to perform a cumbersome task of data analyses, and further the measurement accuracy is insufficient and thus not completely satisfactory.

Also, in a method for measuring the point-blank passing time according to both the sound noise measurement and the peak value of the electric field intensity level of the transponder response signal radio wave, the measurement can be performed with considerable accuracy. However, the peak value of the transponder response signal radio wave itself is flat in time distribution, thus causing a problem that sufficient accuracy can not be achieved.

Recent airplane flights are significantly increased in number, and particularly the number of airplanes taking off from and landing to an airport can be more than 500 per a day. In the surroundings of the airport, flight density can be so high that the flight interval may be less than 90 seconds, resulting in serious pollution of airplane-produced sound noise.

In the case of such a high frequency of flight, the measuring of point-blank passing time according to the above described sound noise-measuring means is difficult to identify individual airplanes and therefore virtually produce no effect. Also, the means for receiving the transponder response signal radio wave has a problem that it is almost impossible to collect the peak value of electric filed intensity of the radio wave.

DISCLOSURE OF THE INVENTION

The invention provides a method for measuring point-blank passing time by receiving, at a measuring point on the ground, a terrain clearance measuring radio wave downwardly directed and emitted from an airport, and inputting to a computer changes in electric field intensity level of the radio wave.

Airplanes are provided with one to three radio wave-transmitting antenna(s) for terrain clearance measurement, which antenna has sharp directivity directed directly downward and is mounted on the bottom surface of the bodyworks thereof. They are flying while emitting a directive radio wave of a sweep signal of 4.3 GHz (in the case of military airplanes, a pulse signal of a frequency band equal to or more than 4.3 GHz), which radio wave is shaped into an emission pattern spreading usually 30° in the forward direction, 20° in the backward direction and 50° to 60° in the right—to —left direction, though these values are different depending on airplane models.

Therefore, by receiving the above described terrain clearance measuring radio wave at one spot on the ground, and inputting and recording to a computer changes in electric field intensity level of the radio wave, it is possible to obtain a waveform of changes in the electric field intensity level while the emission pattern of the terrain clearance measuring radio wave emitted from the airplane is crossing through the above described spot. At this time, the peak value of the waveform indicates that a vertical plane perpendicular to the flight direction and including the directly downward axis of the airplane has passed the above described spot, and the time corresponding to the peak can be regarded as the point-blank passing time.

If the airplane has passed through the sky directly above the measuring point, the length of time required for collecting the changes in electric field intensity level is long and the peak value intensity also becomes highest. However, as the flight path is distant in the sideward direction from the path directly above the spot, the length of data-collecting time required becomes short and the peak value intensity also becomes low. Further, the collecting range, collecting time, peak value intensity and the like also change depending on the flight altitude.

However, the rising to and the falling from the peak value are very abrupt, and therefore point-blank passing time can be accurately measured as long as the peak value can be collected.

FIG. 9 shows a printed out graph of changes in electric field intensity level of the terrain clearance measuring radio wave and the transponder response signal radio wave over 30 minutes, which changes are obtained by receiving both waves of an airplane rising at an altitude of about 700 m above a spot surrounded by a forest area, which is located directly below the takeoff air route and 5 km away in the direction of north from the north end of the runway of Narita airport. Although the received peak values of the terrain clearance measuring radio wave according to the invention are very sharp, the peak values according to the transponder response signal radio wave are so broad at the points of peak values that the peak points are unclear.

FIG. 10 shows comparison data similar to the case of FIG. 9, obtained with respect to an airplane descending at an altitude of about 1500 m above a spot, which is located directly below the landing air route and 20 km away in the direction of south from the south end of Narita airport. Because the spot is located at seaside and can offer a complete view of the overhead sky, the transponder response signal radio waves from many airplanes flying over the wide range are superimposed and received. Therefore, those radio waves are always received at high level, and thus it is difficult to identify individual received signals, and it is needless to say that individual peak values become entirely unknown. In contrast to this, the terrain clearance measuring radio wave according to the present invention is collected clear and sharp in the same manner as in the case of FIG. 9.

The examples of measurement of the above described transponder response signals show the cases in which both radio waves are received by non-directional antennas. However, in the case of targeting an air route where the flight direction and path of flying airplanes are approximately constant, when reception area is limited by the use of unidirectional antenna, it is possible to collect the response signal for each airplane. Then, the response signal is useful as approach information, but it is insufficient in measurement accuracy as point-blank passing information because the peak value of the response signal is flat in width and particularly the directivity of the transponder antenna mounted on an airplane becomes null (sensitivity of zero) in the directly downward direction of the airplane.

The invention is for measuring accurate point-blank passing time by using a terrain clearance measuring radio wave downwardly directed and emitted from an airplane, but the invention also allows receiving the radio wave by a directly-upward-directional antenna to limit a measured area. Particularly because the terrain clearance measuring radio wave is horizontally polarized with respect to the flight direction, receiving the radio wave by a unidirectional polarization antenna permits the reception area of radio wave to be limited to an area extending along a main air route. For example, in the case of an airport having parallel runways, a plurality of polarization antennas corresponding to each runway are divided into the respective runways, thereby permitting the automatic measuring of the passing times, the number of passing airplanes, flight intervals and the like with respect to airplanes taking off or landing.

The directivity characteristic of the above described unidirectional polarization antenna is already known. For example, the directivity coefficient D of a λ/2 dipole type of polarization antenna can be calculated by the following equation, $$D(\theta) = \cos(\pi/2 \cdot \cos\theta)/\sin\theta,$$

and the directivity characteristic diagram thereof can be displayed as an elliptical figure in which the directivity axis is taken as the major axis (see FIG. 6).

Therefore, a plurality of unidirectional polarization antennas of the λ/2 dipole type are combined and placed such that at least one of the antennas may have the directivity axis directed directly upward and the others each may have different directions of directivity axis and/or different receiving polarization planes. Thereby, it is possible to obtain the basic data of azimuth direction with respect to the spatial position of the airplane at this time at the measuring point, data of azimuth angle, and data of flight direction of the airplane, together with the point-blank passing time of airplanes.

For example, as shown as antennas A and B in FIG. 1, two polarization antennas (a1, a2) of a λ/2 dipole type are combined such that the antennas may both have directly-upward vertical directivity axes and both element axes of the antennas are horizontally orthogonal to each other so as for the receiving polarization planes to be orthogonal to each other. In this combination, when the antennas receives the terrain clearance measuring radio wave of an airplane, the signal outputs of both antennas exhibit peak values at the point-blank passing time of the airplane, and the ratio between the respective intensity peak values indicates a specific numerical value of the directivity coefficient value ratio shown in Table 1, which numerical value is dependent on the azimuth angle with respect to the spatial position of the airplane at that time.

For example, when the polarization antenna a1 gives a peak value and the polarization antenna a2 senses nothing, the airplane position is located in the azimuth of the directivity axis of the antenna a1. When the ratio between the output values of a1 and a2 is 1, the airplane position is located in the direction of the azimuth angle of either 45° or 135° with respect to the directivity axis directions of the antennas. When the output ratio is a value other than these, it is indicated that the airplane is located at an azimuth angle other than the above described angle according to the ratio.

FIG. 6 is a diagram for showing the directivity characteristics of both antennas a1 and a2 in this case, and Table 2 is a table for showing the ratio between both directivity coefficient values according to the respective directivity coefficient values of both antennas and the arrival direction of the radio wave. Based on this table, it is possible to obtain basic data on azimuth angles with respect to the spatial position of an airplane.

Further, two polarization antennas a1 and a2 of a λ/2 dipole type are combined such that the pole elements of both antennas may be horizontal and parallel to each other so as for both receiving polarization planes to coincide with each other, and the antenna a1 has the directivity axis directed directly-upward in the vertical direction and the antenna a2 has the directivity axis inclined 30° toward the sky with respect to the vertical axis. In the this case, the directivity characteristic diagram is given as shown in FIG. 7, and the directivity coefficient values and the ratio between both coefficient values are specified according to the spatial position of airplanes, as shown in Table 2.

Therefore, the point-blank passing time of the airplane can be measured by the time when the antenna a1 gives a peak value, and also the elevation angle with respect to the airplane position at the measuring point at that time can be obtained by the ratio between the output value of the antenna 2 at this time and the output value of the above described peak value.

A receiving device comprising the above described combination of two polarization antennas is useful mainly for measuring the passing time and the number of passing airplanes with regard to the passage of airplanes flying along a given air route. However, a plurality of these two antenna combinations can be combined to expand the measurable sky area and achieve the increased degree of measuring accuracy of the flight traveling direction and traveling azimuth angle of airplanes.

For example, in contrast to the set of the above described two polarization antennas a1 and a2 which each have polarization planes orthogonal to each other and directly-upward vertical directivity, if the antenna a1 and a2 each have directivity inclined toward the overhead sky in the four directions with respect to the vertical axis and each of the antennas a1 and a2 is combined with four polarization antennas which have receiving polarization planes overlapped with the receiving polarization planes of the antennas a1 and a2, that is, use of a total 10 channel type of receiving device, it is possible to perform measurement adaptable to all flight directions.

However, in this case, processing of data received by the 10 channels becomes complicated, thereby causing a problem of increased cost of the receiving device and computer equipment.

Practically, 6 polarization antennas are combined and placed to configure a 6 channel type of receiving device, wherein two of them have directly-upward directivity axes and polarization planes orthogonal to each other, and other four antennas have the same receiving polarization plane as one of the above described directly-upward-directional antennas and are inclined such that their directivity axes may be respectively spread out toward the overhead sky so as to divide the sky into four parts. Thus, the 6 channel type of receiving device inputs, to a computer, respective changes in electric field intensity level of the terrain clearance measuring radio wave of an airplane, whereby together with the point-blank passing time of the airplane, data on the azimuth angle and elevation angle with respect to the spatial position of the airplane at that time as well as the flight traveling direction thereof can be measured. This measurement can be economically and effectively performed mainly for measuring airplanes flying along a prescribed air route.

Further, the time for measuring an airplane model identifying signal obtained by receiving a transponder response signal transmitted from the airplane and the respective data obtained by flight altitude measurement and sound noise measurement is tailored to coincide with the measurement of the above described point-blank passing time obtained by receiving the terrain clearance measuring radio wave. Thereby, reliability of various measurements on individual airplanes can be increased, and particularly selecting of airplane-produced sound noise from the sound noise can be very accurately and easily performed.

In this case, the receiving point for the terrain clearance measuring radio wave, the receiving point for the transponder response signal, and the measuring point for the sound noise may be the same spot or different spots separated from each other.

Then, a plurality of measuring points for point-blank passing time are distributed and provided, with 2–4 Km spacing provided between the measuring points, on the ground including an area located directly below the air route. Further, a plurality of sound noise-measuring points are distributed and arranged at required positions between the point-blank passing time-measuring points, and furthermore a transponder response signal-receiving point is provided at an arbitrary spots. In this manner, the data measured at those spots are collected to a central aggregation office, thereby permitting accurate and easy measurement of the flight conditions, flight courses and the like of airplanes and the situations of distribution of sound noise produced over a given area by the airplanes.

In the present invention, the changes in electric field intensity level of the terrain clearance measuring radio wave obtained by the directly-upward-directional antenna shows intensity change starting to be received 5 to 10 seconds before the point-blank passing time of airplanes and abruptly rising about 2 to 3 seconds before the passing time, wherein the airplane are at an altitude equal to or less than 2000 m and have the potential for effecting sound noise on the measuring point. Therefore, a camera having a photography field directed in the directly-upward direction is provided at a spot located directly below the air route and the time of its initiation is controlled by using, as the trigger, a given intensity value of the rising electric field intensity of the terrain clearance measuring radio wave, thereby permitting easy collection of effective airplane passage records.

BRIEF DESCRIPTION OF THE DRAWINGS

FIG. 10 is an edit diagram for showing video camera-photographed frame pictures of an airplane flying through the overhead sky according to a third embodiment;

FIG. 11 is a display diagram for showing changes in electric field intensity levels of the terrain clearance measuring radio wave and transponder response signal radio wave of an airplane when both waves are received at the same time; and FIG. 12 is a display diagram similar to FIG. 11 for showing the case of changed measuring points.

DESCRIPTION OF SYMBOLS

A, B, C, D, E, F: Polarization antenna
P: Element axis
H: Flight altitude
M: Point-blank position
O: Point-blank passing time-measuring point
S: Sound noise-measuring point
R: Prescribed air route
Z: End of runway

BEST ASPECT FOR CARRYING OUT THE INVENTION

Aspect 1

Figure 1:
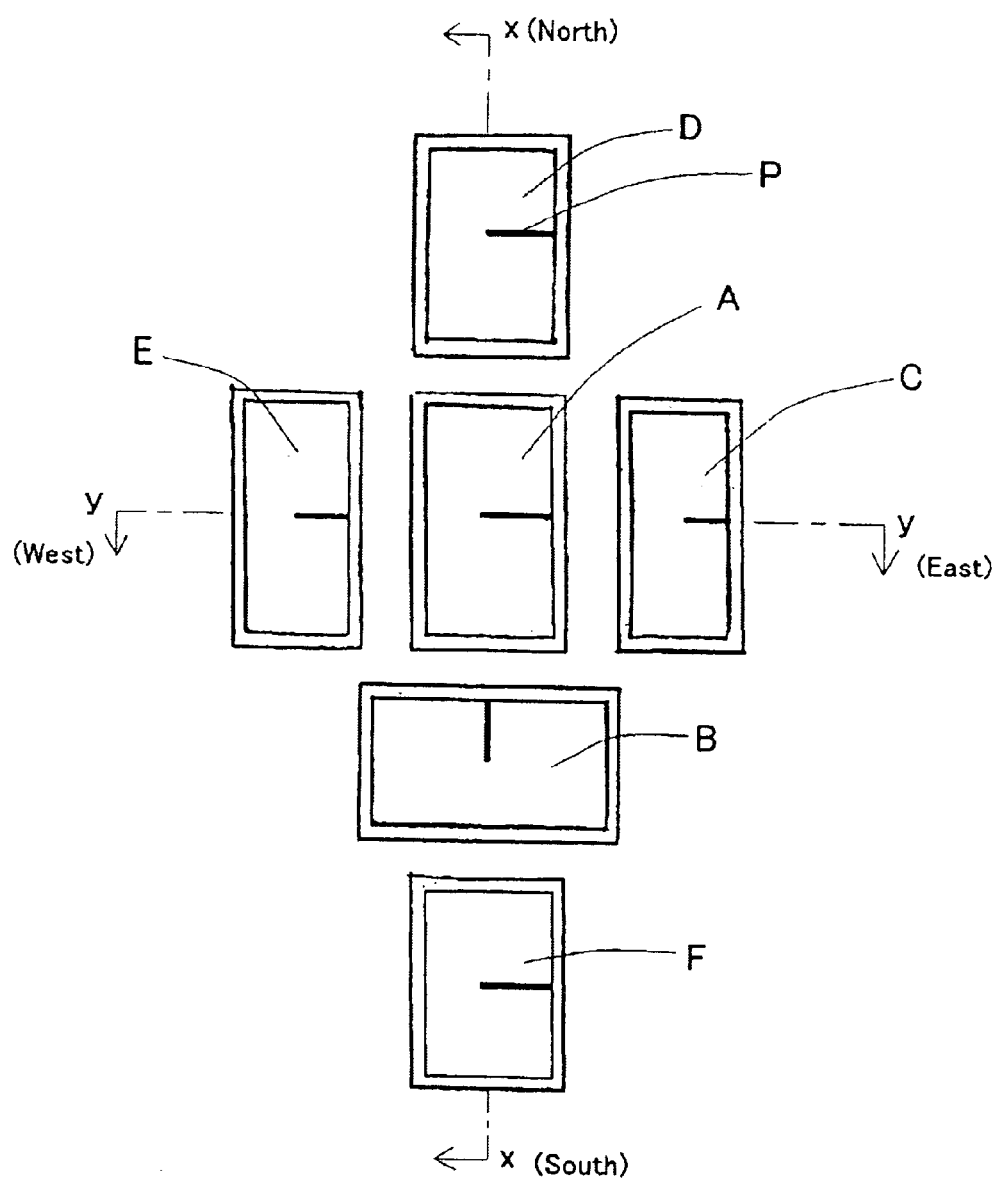
FIG. 1 is a plan view for showing a combination and placement of six polarization antennas according to a first embodiment.
Figure 4:
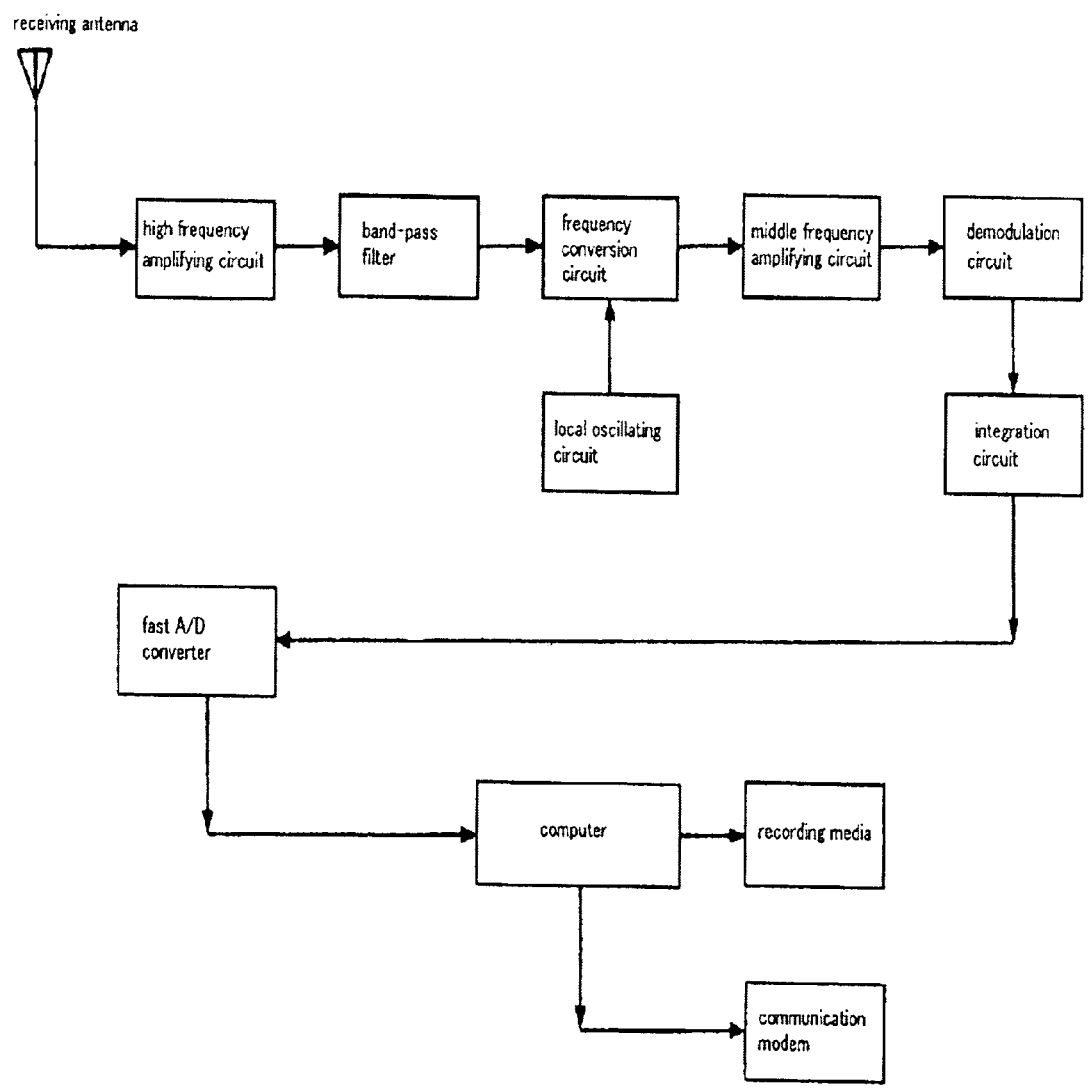
FIG. 4 is a block diagram for showing an electric field intensity-measuring circuit for a terrain clearance measuring radio wave.

A six channel type of receiving device is fixedly mounted on the upper end of a 2 m high column provided at a spot located about 5 km away in the direction of north from the north end of the runway of Narita airport, wherein the receiving device has six polarization antennas combined according to the conditions shown in FIG. 1 for receiving the terrain clearance measuring radio wave of an airplane. Also, an antenna for receiving the transponder response signal radio wave is mounted on the side of the column. Changes in electric field intensity levels of the radio waves are input and recorded to a computer via a circuit shown in a block diagram of FIG. 4 by the respective antenna-received signals.

Figure 5:
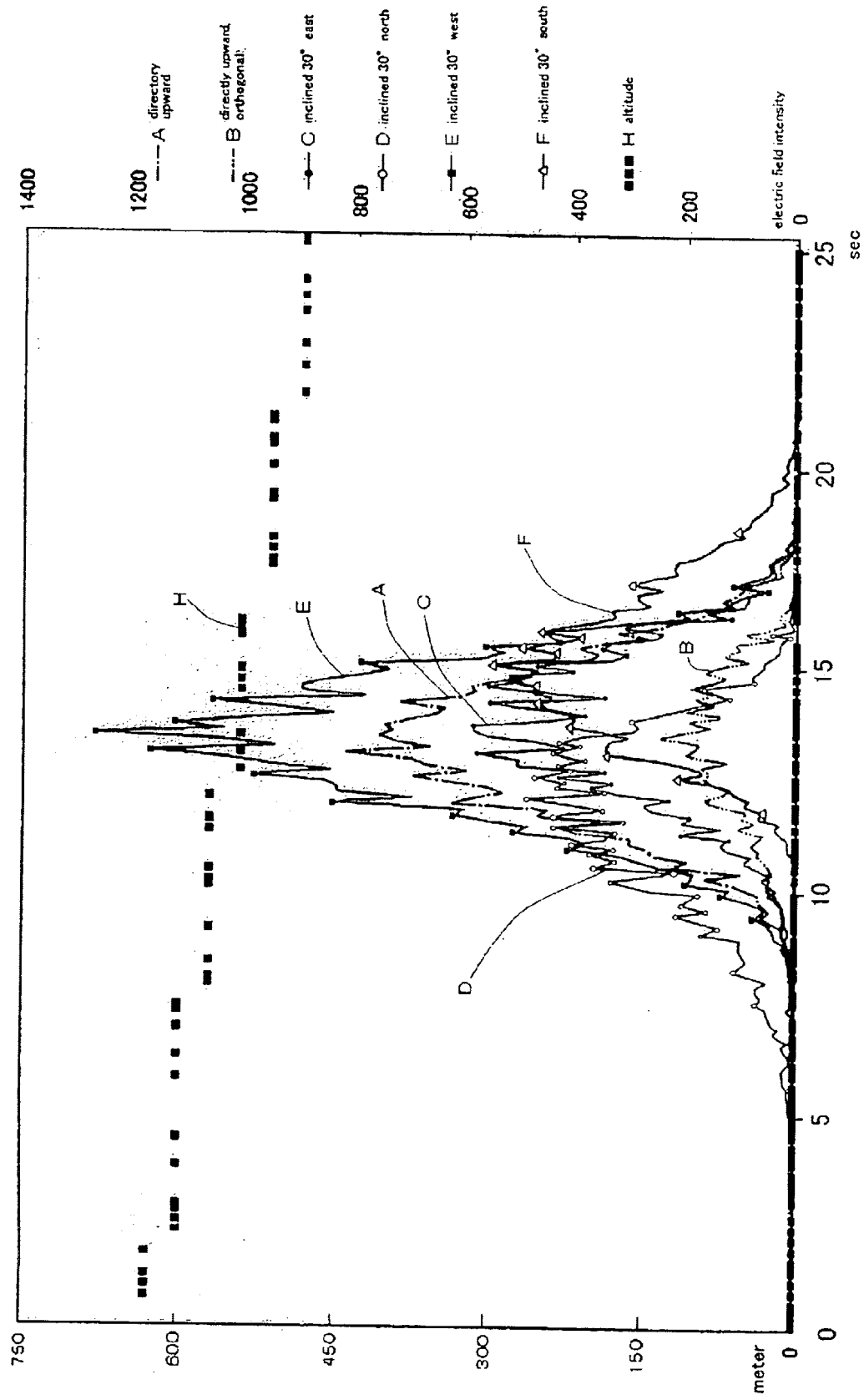
FIG. 5 is a display diagram for showing a printout of data input and recorded to computer.
Figure 6:
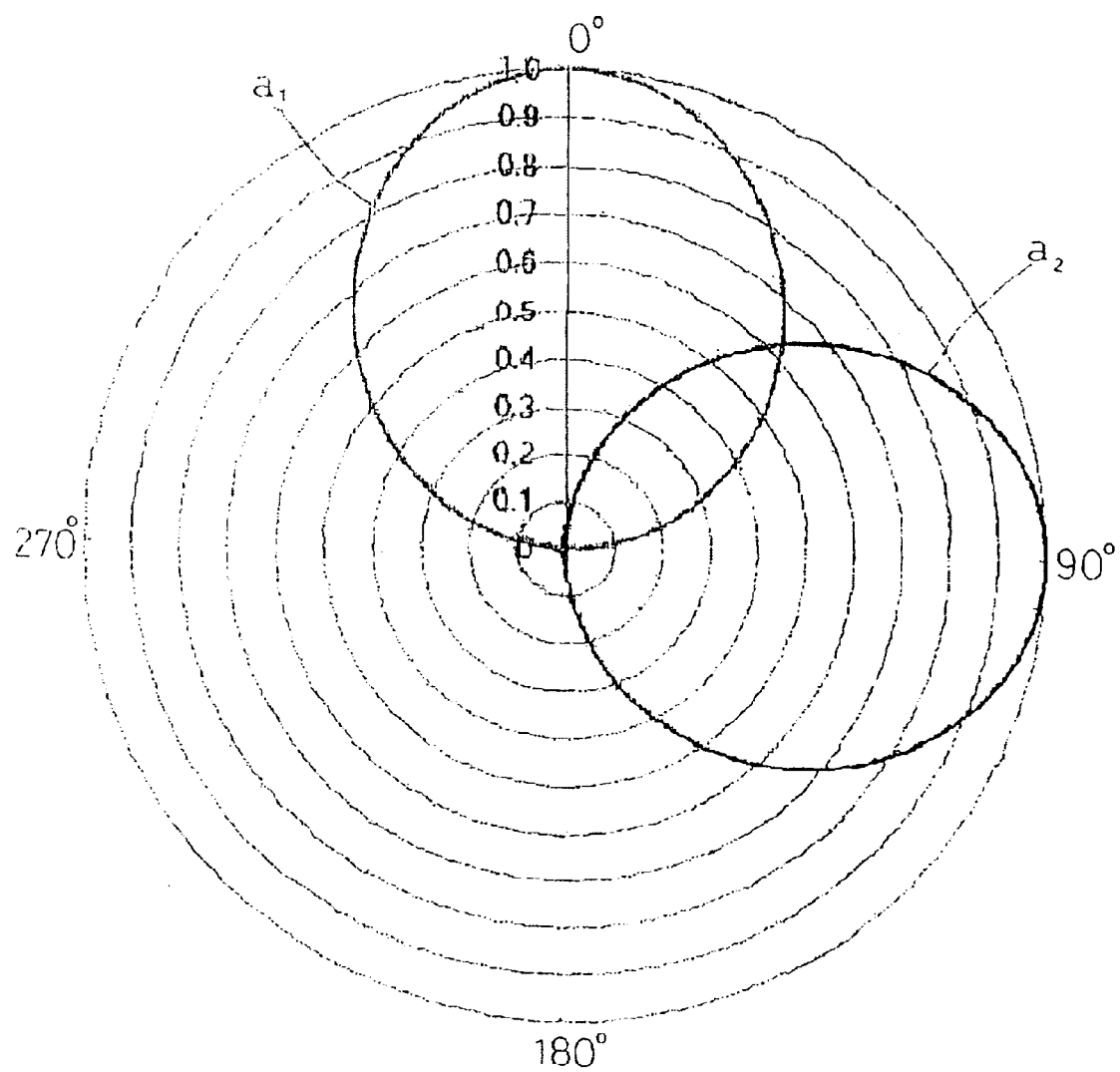
FIG. 6 is a directivity characteristic of two polarization antennas of a $\lambda/2$ dipole type which are combined to be orthogonal to each other.
Figure 7:
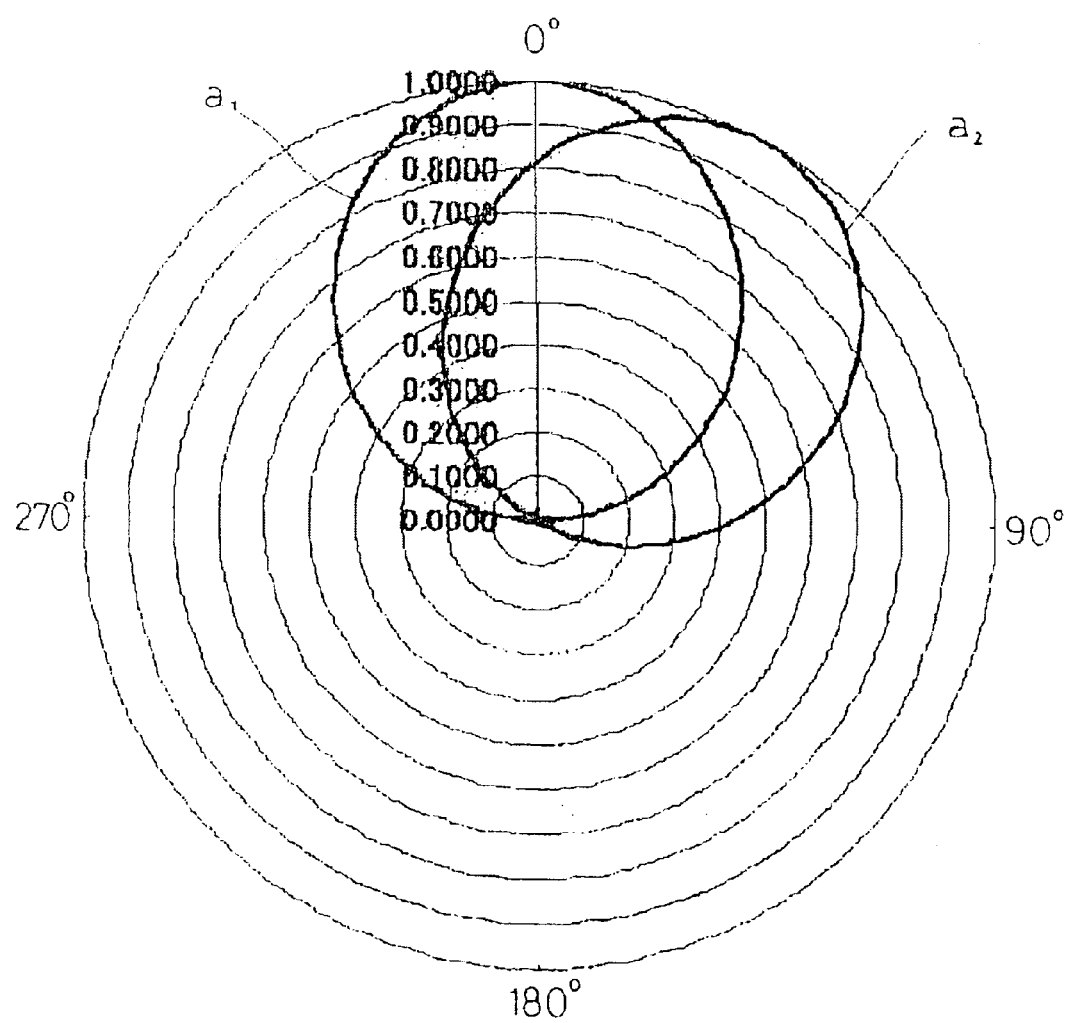
FIG. 7 is a directivity characteristic of two polarization antennas of a $\lambda/2$ dipole type which are combined to form 30° between their directivity axes.

FIG. 5 shows the printout of the recorded changes of each data.

Figure 2:
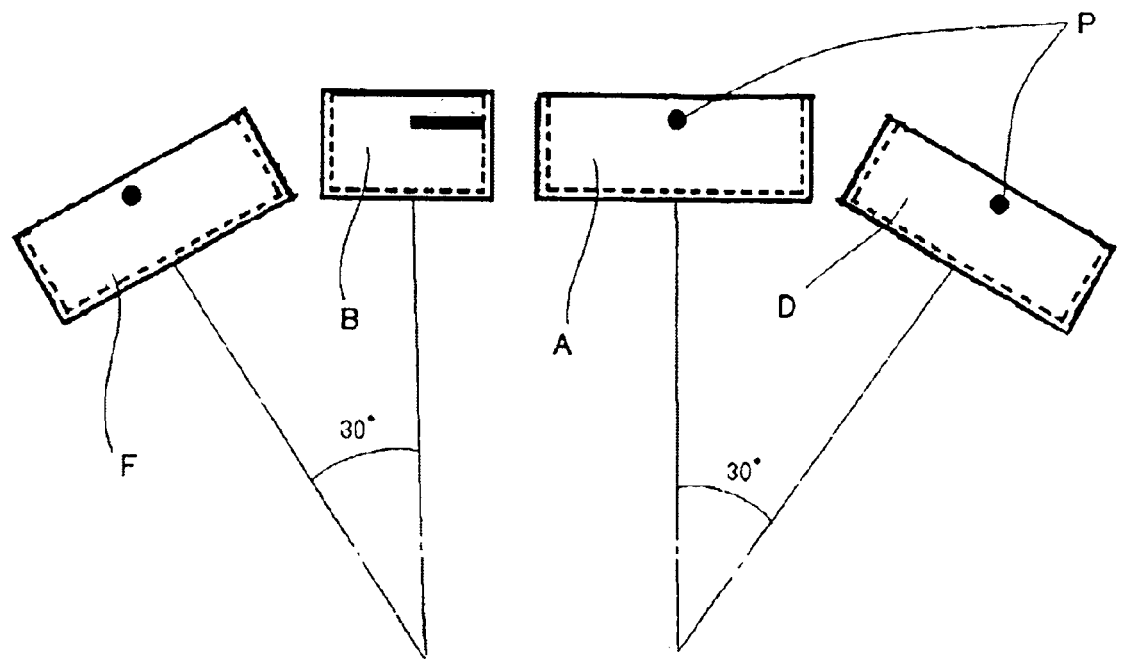
FIG. 2 is a side view for showing the placement of the four polarization antennas taken along a line x—x of FIG. 1.
Figure 3:
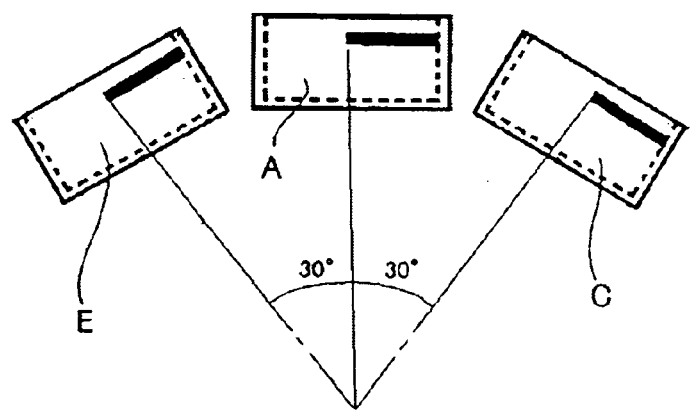
FIG. 3 is a side view for showing the placement of the three polarization antennas taken along a line y—y of FIG. 1.

FIG. 1 is a plan view for showing the combination and placement of six polarization antennas of a λ/2 dipole type which antenna is to receive a 4 GHz band for the terrain clearance measurement and has a half-value angle width of about 80°. FIG. 2 is a side view for showing the placement condition along an axis x—x of FIG. 1, and FIG. 3 is a side view for showing the placement condition along an axis y—y of FIG. 1.

Antennas A and B are of vertical directly-upward-directed directivity and are placed such that their element axes P have the polarization planes orthogonal to each other in the horizontal direction, and antennas C, D, E, and F surround the vertical axis and are each inclined 30° with respect to the vertical axis to have directivity directed toward the overhead sky in the four directions of east, north, west and south, wherein the element axes P of the antennas D and F and the antenna A are horizontal and parallel, and the element axes P of the antennas C and E are the same in the direction of orientation as the antenna A and are each inclined 30° in the opposite direction.

FIG. 5 is a graph with a horizontal axis indicating time and a vertical axis indicating electric filed intensity values and flight altitude, for showing the printout of data input and recorded to a computer, wherein the x—x axis of the above combined antennas lies in the direction of south-north at a measuring point, and the above data includes the changes in electric field intensity level obtained by receiving a terrain clearance measuring radio wave emitted from an airplane flying through the overhead sky above a measuring point, and the flight altitude information obtained by decoding the transponder response signal radio.

From the graph of FIG. 5, the respective times at which the directly-upward-directional antennas A and B gives peak values approximately coincide with each other, showing the point-blank passing time of an airplane. The ratio (A/B) between the respective peak values A 820 and B 230 is 3.562. Thus, Table 1 shows that the azimuth angle with respect to the arrival direction of the radio wave is 19° or 341°, indicating that the airplane is located in either direction of these angles at the point-blank passing time. Further, each output value of the antennas C (east), D (north), E (west), and F (south) inclined and directed in the four directions is related as E>D>C>F at the point-blank passing time, indicating that the airplane is located in the west south direction from the measuring point O, and it can be known that the airplane is located in the vertical plane including the direction of an azimuth angle of 19°+180° from the measuring point. Further, because the output values are related as E≈D>F>C about 3 seconds before the point-blank passing time and as F≈E >C>D about 3 seconds after the point-blank passing time, it can be known that the airplane passed through the point-blank position from northwest and then flied toward in the direction of east-southeast. Also, the intensity ratio between the peak value 820 of A at the point-blank passing time and the output value 1180 of the antenna E at that time is 0.695, and therefore it can be known from Table 2 that the elevation angle with respect to the airplane at the point-blank position is about 42°, and the altitude of the airplane is known about 540 m by decoding the transponder response signal at that time.

From the above data, it can be known that the air plane is located at the position of an azimuth angle 199, elevation angle 42, and an altitude 540 m with respect to the measuring point O, and the above position is a straight distance of 810 m, and a horizontal distance of 600 m on the ground plane, from the measuring point, and that the flight direction of the airplane heads from west-southwest to east-southeast at an azimuth angle 109° orthogonal to a vertical plane including the above described azimuth angle.

Figure 8:
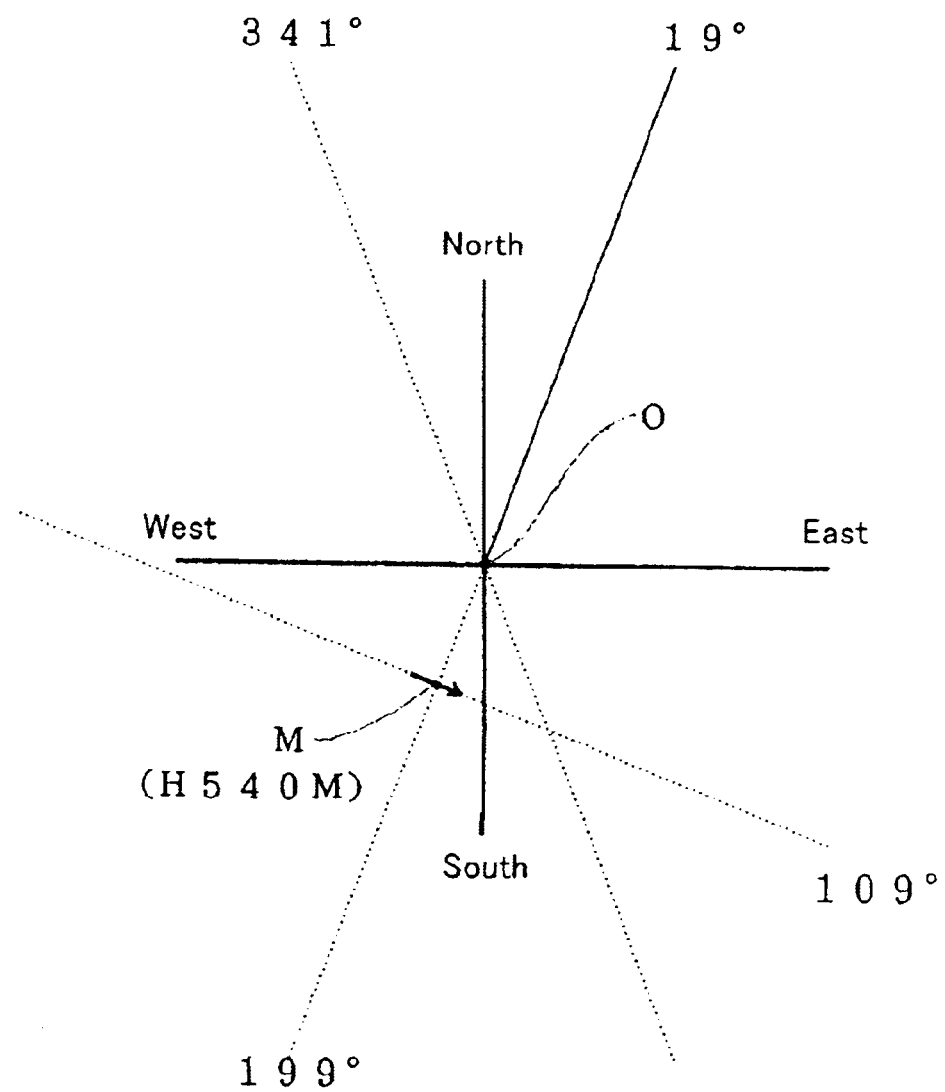
FIG. 8 is a display diagram for showing the position and flight direction of an airplane at the point-blank passing time depicted on a map, based on the recorded data of FIG. 5.

FIG. 8 is a display diagram for showing the position and flight direction of the airplane at the point-blank passing time depicted on a map, based on the above data.

Aspect 2

Figure 9:
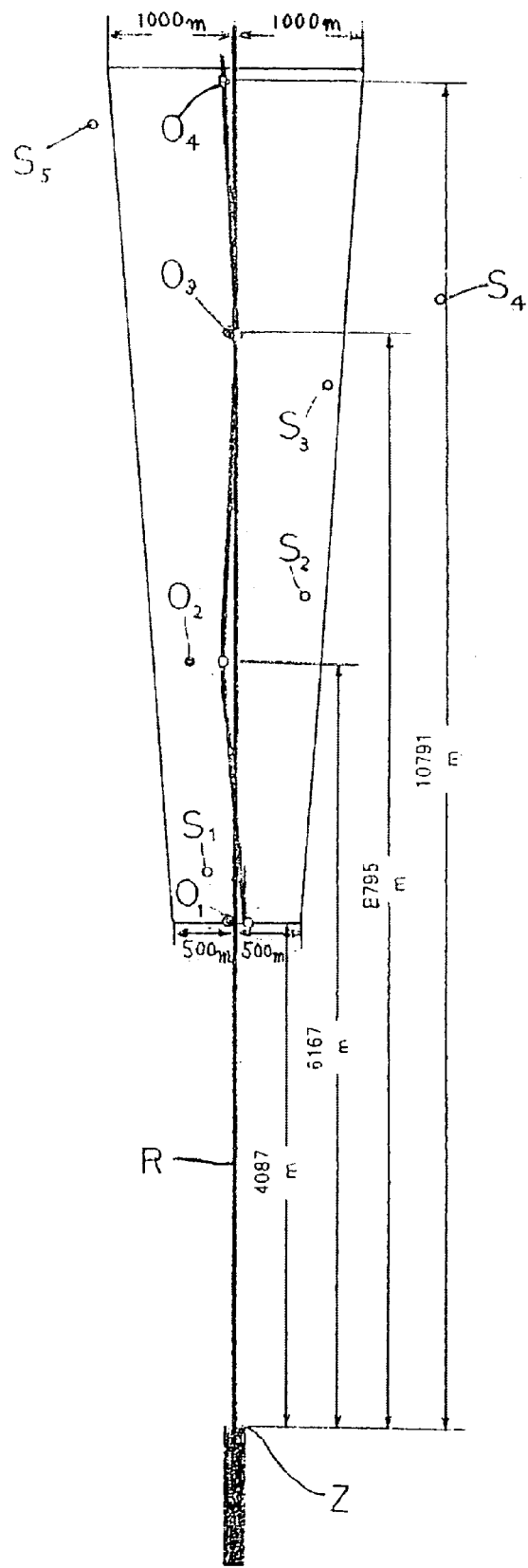
FIG. 9 is an arrangement diagram for showing four point-blank passing time-measuring points along an air route and five sound noise-measuring points located in between the measuring points according to a second embodiment.

As a sound noise-measuring system covering an area including a zone located directly below a 12 km long, straight air route extending in the north direction from the north end of the runway of Narita airport, as shown in FIG. 9, the same receiving and measuring points O1 to O4 for the terrain clearance measuring radio wave as in the first embodiment are provided at four spots located approximately along and directly below the prescribed air route R, and sound noise-measuring points S1 to S6 are provided at six spots in between the receiving and measuring points, and thus the measurement data obtained at each measuring point is collected to a central aggregation office, whereby required data in accordance with an object is obtained as follows.

Usually, airplanes taking off from and landing to an airport are controlled to fly within an allowed area including both side zones having a predetermined lateral distance and extending along a prescribed air route, and the width of the allowed area is 500 m in the lateral direction at a position 5 km away from the end of the runway, and 1000 m at a position 10 km.

Therefore, based on each point-blank passing time measured at the measuring points O1 to O4 and distances between the measuring points, an average horizontal speed of an airplane can be calculated. Further, the point-blank passing time at each sound noise-measuring point also can be accurately estimated based on a distance between a measuring point O and a spot where the normal from the sound noise-measuring point to the prescribed air route intersects to the air route. Therefore, identification and extraction of airplane-produced sound noise out of the data of sound noise measurement forming a complicated waveform can be accurately and easily performed with reference to the passing time.

In this example, each space distance of the runway end Z~O1~O2~O3~O4 is 4087 m, 2092 m, 2659 m, 1996 m, respectively, and the corresponding flight times are 66 seconds in the predicted value based on data base for the space distance of the runway end Z~O1, and 21 seconds, 24 seconds, 23 seconds in measured values for the space distances O1~O2~O3~O4, respectively. Therefore, the average horizontal speeds for the respective space distances are calculated as 60 m/second, 99.6 m/second, 110.8 m/second, and 88.8 m/second, respectively. Based on this, the point-blank passing times at each of the sound noise-measuring points S1 to S5 located between the measuring points can be approximately accurately calculated.

Further, in the case of the above described case, when flight model-identifying data and altitude signal data obtained by reception of the transponder response signal collected at an arbitrary spot are combined with data of an azimuth angle and elevation angle with respect to the arrival direction of the terrain clearance measuring radio wave at each point-blank passing time at each of the measuring points O1 to O4, it is also possible to measure the flight position and flight direction of the airplane at each measuring point. Further, these data obtained at each measuring point can be comprehensively computed at a central aggregation office to calculate an accurate flight course, thereby providing reliable materials for flight management and materials for countermeasures against airplane-produced sound noise.

Aspect 3

FIG. 12 shows a photographic record shot by a camera, of which field of view is a given range of the overhead sky having its center located directly above a measuring point, according to an embodiment of a method of photographing at the point-blank passing time, wherein, when changes in electric field intensity level of a terrain clearance measuring radio wave emitted in the aeronautical area is received by a receiving antenna having directivity directed in the directly-upward direction of the spot and is then input and recorded to a computer, the camera is initiated by a trigger signal of a predetermined intensity value in the rising process of the electric field intensity.

This record is a time series edition of a 1/30 second frame exposure portion of takeoff airplane pictures taken by a video camera provided at a measuring point, which point is located directly below the air route and 7 km away in the north direction from the north end of the runway of Narita airport. According to seven airplane pictures recorded from 20 minutes past 13 o' clock to 56 minutes at the same o' clock Sep. 12, 2000, each airplane passed through the sky a little apart in the direction of west from the sky directly above the measuring point, and the airplane models, flight directions, and flight altitudes can be estimated from the shapes and sizes of the airplane pictures, which are useful as on-target airplane passage records.

INDUSTRIAL APPLICABILITY

According to the invention, the measuring of the point-blank passing time with respect to an overhead passing airplane is performed by receiving a terrain clearance measuring radio wave directed directly downward from the airplane, and inputting and recording changes in electric field intensity level of the radio wave, and using the time when a peak value of the changes is produced. Therefore, as compared with a conventional method based on the measured value of sound noise and the value of electric field intensity of a transponder response signal radio wave, more accurate and reliable measurement can be performed. Particularly, in the case of high flight frequency where measurement by the prior art method is almost impossible or very inferior in accuracy, the present invention allows accurate measurement of the point-blank passing times of the individual airplanes.

Based on this accurate measurement of point-blank passing time, it is possible to recognize flight conditions of an airplane by combining the directivity characteristics of a plurality of antennas for receiving the terrain clearance measuring radio wave, and by simultaneously using sound noise-measuring means and transponder response signal-decoding means together with the combined antennas, it is possible to increase accuracy in various measurements on the airplane. In addition, by scattering and distributing these measuring points on the ground and, if required, distributing and placing sound noise-measuring points between the measuring points, collecting these data to the central aggregation office it is possible to obtain flight control materials such as reliable flight course and the like or basic materials for countermeasures against airplane-produced sound noise over a given area.

Further, the invention may be used as invasion alarming means for abnormal path not following air traffic control and a suspicious airplane in low-altitude flight.

TABLE 1

| Angle | Antenna a1 | Antenna a2 | $a_1:a_2$ |
|---|---|---|---|
| 0 | 1.0000 | 0.0000 | |
| 2 | 0.9991 | 0.0274 | 36.4393 |
| 4 | 0.9964 | 0.0549 | 18.1654 |
| 6 | 0.9920 | 0.0823 | 12.0502 |
| 8 | 0.9858 | 0.1098 | 8.9751 |
| 10 | 0.9779 | 0.1374 | 7.1164 |
| 12 | 0.9683 | 0.1651 | 5.8662 |
| 14 | 0.9571 | 0.1928 | 4.9642 |
| 16 | 0.9443 | 0.2206 | 4.2801 |
| 18 | 0.9300 | 0.2485 | 3.7418 |
| 20 | 0.9143 | 0.2766 | 3.3058 |
| 22 | 0.8971 | 0.3047 | 2.9447 |
| 24 | 0.8787 | 0.3329 | 2.6399 |
| 26 | 0.8591 | 0.3611 | 2.3789 |
| 28 | 0.8383 | 0.3894 | 2.1526 |
| 30 | 0.8165 | 0.4178 | 1.9543 |
| 32 | 0.7937 | 0.4462 | 1.7790 |
| 34 | 0.7700 | 0.4745 | 1.6229 |
| 36 | 0.7456 | 0.5028 | 1.4830 |
| 38 | 0.7204 | 0.5309 | 1.3569 |
| 40 | 0.6946 | 0.5589 | 1.2428 |
| 42 | 0.6683 | 0.5867 | 1.1390 |
| 44 | 0.6415 | 0.6143 | 1.0443 |
| 46 | 0.6143 | 0.6415 | 0.9576 |
| 48 | 0.5867 | 0.6683 | 0.8780 |
| 50 | 0.5589 | 0.6946 | 0.8046 |
| 52 | 0.5309 | 0.7204 | 0.7370 |
| 54 | 0.5028 | 0.7456 | 0.6743 |
| 56 | 0.4745 | 0.7700 | 0.6162 |
| 58 | 0.4462 | 0.7937 | 0.5621 |
| 60 | 0.4178 | 0.8165 | 0.5117 |
| 62 | 0.3894 | 0.8383 | 0.4646 |
| 64 | 0.3611 | 0.8591 | 0.4204 |
| 66 | 0.3329 | 0.8787 | 0.3788 |
| 68 | 0.3047 | 0.8971 | 0.3396 |
| 70 | 0.2766 | 0.9143 | 0.3025 |
| 72 | 0.2485 | 0.9300 | 0.2673 |
| 74 | 0.2206 | 0.9443 | 0.2336 |
| 76 | 0.1928 | 0.9571 | 0.2014 |
| 78 | 0.1651 | 0.9683 | 0.1705 |
| 80 | 0.1374 | 0.9779 | 0.1405 |
| 82 | 0.1098 | 0.9858 | 0.1114 |
| 84 | 0.0823 | 0.9920 | 0.0830 |
| 86 | 0.0549 | 0.9964 | 0.0551 |
| 88 | 0.0274 | 0.9991 | 0.0274 |
| 90 | 0.0000 | 1.0000 | 0.0000 |

TABLE 2

| Angle | Antenna a1 | Antenna a2 | $a_1:a_2$ |
|---|---|---|---|
| 0 | 1.0000 | 0.8165 | 1.2247 |
| 2 | 0.9991 | 0.8383 | 1.1918 |
| 4 | 0.9964 | 0.8591 | 1.1599 |
| 6 | 0.9920 | 0.8787 | 1.1289 |
| 8 | 0.9858 | 0.8971 | 1.0989 |
| 10 | 0.9779 | 0.9143 | 1.0695 |
| 12 | 0.9683 | 0.9300 | 1.0412 |
| 14 | 0.9571 | 0.9443 | 1.0135 |
| 16 | 0.9443 | 0.9571 | 0.9866 |
| 18 | 0.9300 | 0.9683 | 0.9605 |
| 20 | 0.9143 | 0.9779 | 0.9349 |
| 22 | 0.8971 | 0.9858 | 0.9101 |
| 24 | 0.8787 | 0.9920 | 0.8858 |
| 26 | 0.8591 | 0.9964 | 0.8622 |
| 28 | 0.8383 | 0.9991 | 0.8391 |
| 30 | 0.8165 | 1.0000 | 0.8165 |
| 32 | 0.7937 | 0.9991 | 0.7944 |
| 34 | 0.7700 | 0.9964 | 0.7728 |
| 36 | 0.7456 | 0.9920 | 0.7516 |
| 38 | 0.7204 | 0.9858 | 0.7308 |

TABLE 2-continued

| Angle | Antenna a1 | Antenna a2 | a₁:a₂ |
|---|---|---|---|
| 40 | 0.6946 | 0.9779 | 0.7103 |
| 42 | 0.6683 | 0.9683 | 0.6902 |
| 44 | 0.6415 | 0.9571 | 0.6702 |
| 46 | 0.6143 | 0.9443 | 0.6505 |
| 48 | 0.5867 | 0.9300 | 0.6309 |
| 50 | 0.5589 | 0.9143 | 0.6113 |
| 52 | 0.5309 | 0.8971 | 0.5918 |
| 54 | 0.5028 | 0.8787 | 0.5722 |
| 56 | 0.4745 | 0.8591 | 0.5523 |
| 58 | 0.4462 | 0.8383 | 0.5322 |
| 60 | 0.4178 | 0.8165 | 0.5117 |

What is claim is:

1. A method for measuring the point-blank passing time of an airplane, characterized by continuously receiving a terrain clearance measuring radio wave downwardly directed and emitted from the airplane flying through the overhead sky at one spot on the ground, and inputting and recording to a computer changes in electric field intensity level of the wave.

2. The method for measuring the point-blank passing time of an airplane according to claim 1, wherein the reception of the terrain clearance measuring radio wave is performed by an antenna which is horizontally non-directional and directly-upward directional.

3. The method for measuring the point-blank passing time of an airplane according to claim 1, wherein a receivable area of the terrain clearance measuring radio wave is limited to one direction by a polarization antenna which is horizontally unidirectional and directly-upward directional.

4. The method for measuring the point-blank passing time of an airplane according to claim 1, wherein the receiving of the terrain clearance measuring radio wave is performed by combining two polarization antennas each having horizontally unidirectional and directly-upward directional directivity such that the elements axes of the antennas may be orthogonal to each other or may obliquely intersect, and wherein the changes in electric field intensity received by each of the two antennas are input and recorded to a computer at the same time, thereby providing basic data on an azimuth angle with respect to the position of the airplane at the point-blank passing time.

5. The method for measuring the point-blank passing time of an airplane according to claim 1, wherein the reception of the terrain clearance measuring radio wave is performed by combining and placing six polarization antennas, wherein two antennas of the antennas have directly-upward-directed directivity and the element axes orthogonal to each other in the horizontal direction, and the other four antennas have the element axes conformed to the element axis of one of said directly-upward-directed directivity antennas in the direction of orientation and are inclined such that their axes of directivity, surrounding the directly upward axis, may be respectively spread out toward the overhead sky so as to divide the sky into four parts, and the respective changes in electric field level received by the six antennas are input to the computer at the same time, thereby providing an azimuth angle and elevation angle as well as flight direction data with respect to the flight position of the airplane at the point-blank passing time.

6. A method for measuring the point-blank passing time and sound noise of an airplane, characterized in that together with changes in electric field intensity level obtained by continuously receiving a terrain clearance measuring radio wave downwardly directed and emitted from said airplane flying through the overhead sky at one spot on the ground, airplane model identifying signal information and flight altitude information obtained by receiving and decoding a transponder response signal radio wave emitted from said airplane at the same time at the same spot or a different spot and/or sound noise data from said airplane measured at the same spot or a different spot are input and recorded to a computer.

7. A method for estimating the point-blank passing time of an airplane, characterized by inputting and recording, to a computer of a central aggregation office, data on changes in electric field intensity level obtained by continuously receiving a terrain clearance measuring radio wave downwardly directed and emitted from an airplane flying through the overhead sky at each of a plurality of spots scattered and distributed on the ground plane, wherein the point-blank passing time of said airplane at an intermediate spot other than said measuring points is estimated.

8. A method for measuring a flight course of an airplane and/or noise produced by the airplane, characterized by inputting and recording to a computer of a central aggregation office, together with data on changes in electric field intensity level obtained by continuously receiving a terrain clearance measuring radio wave downwardly directionally emitted from the airplane flying through the overhead sky at each of a plurality of scattered and distributed points on the ground surface, an airplane model identifying signal and flight altitude information data obtained by continuously receiving a transponder response signal emitted from the airplane at the same point or a different point at the same time, and/or noise data obtained at the same point or a different point at the same time.

9. A method for photographing an airplane at the point-blank passing time characterized in that, in conjunction with the inputting and recording, to a computer, of changes in electric field intensity level obtained by continuously receiving a terrain clearance measuring radio wave downwardly directed and emitted from an airplane flying through the overhead sky at one spot on the ground, a camera for photographing a given range of the sky directly above the spot is initiated when the electric field intensity level reaches to a given value.

* * * * *